US008450990B2

(12) United States Patent
Shi et al.

(10) Patent No.: US 8,450,990 B2
(45) Date of Patent: May 28, 2013

(54) DYNAMIC CONTROL LOOP FOR SWITCHING REGULATORS

(75) Inventors: Justin Shi, Ann Arbor, MI (US); Alan Roth, Leander, TX (US); Justin Gaither, Austin, TX (US); Eric Soenen, Austin, TX (US)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 344 days.

(21) Appl. No.: 12/856,918

(22) Filed: Aug. 16, 2010

(65) Prior Publication Data

US 2012/0038340 A1    Feb. 16, 2012

(51) Int. Cl.
*G05F 1/575* (2006.01)
*G05F 1/618* (2006.01)

(52) U.S. Cl.
USPC ........................................................ 323/284

(58) Field of Classification Search
USPC ................. 323/282, 284, 285, 351, 222, 223, 323/225
See application file for complete search history.

(56) References Cited

U.S. PATENT DOCUMENTS

| 5,801,518 | A  |   | 9/1998  | Ozaki et al. |
|-----------|----|---|---------|---------------|
| 6,346,801 | B1 |   | 2/2002  | Zafarana et al. |
| 6,791,306 | B2 | * | 9/2004  | Walters et al. ................ 323/288 |
| 6,798,262 | B2 |   | 9/2004  | Zhang |
| 6,885,175 | B2 | * | 4/2005  | Mihalka ........................ 323/282 |
| 7,075,280 | B2 |   | 7/2006  | May |
| 7,612,545 | B2 | * | 11/2009 | Umemoto et al. ............ 323/271 |
| RE42,142  | E  | * | 2/2011  | Solie et al. .................... 323/222 |
| 2009/0237966 | A1 | | 9/2009 | Soenen et al. |

* cited by examiner

*Primary Examiner* — Gary L Laxton
(74) *Attorney, Agent, or Firm* — Lowe Hauptman Ham & Berner, LLP

(57) ABSTRACT

A method of controlling a regulator includes turning on a first driver during a first cycle for a first time period. A second driver is turned on during the first cycle for a second time period. The first and second drivers are off during the first cycle for a third time period. The first time period is adjusted to become an adjusted first time period for a second cycle based on a ratio and a voltage difference between a peak value of the output voltage and a first voltage during the first cycle. The ratio refers to the first time period over the first time period and the second time period.

20 Claims, 3 Drawing Sheets

DYNAMIC CONTROL LOOP FOR SWITCHING REGULATORS

FIELD

The present disclosure is generally related to regulators, and more particularly to a dynamic control loop for switching regulators.

BACKGROUND

Switching regulators or direct-current to direct-current (DC-DC) voltage converters (i.e., DC-DC converters) commonly include a pulse frequency modulation (PFM) component in a feedback loop having pre-determined reference voltages and comparators. For example, in one approach, the feedback loop includes two comparators receiving two reference voltages as inputs, which adds design complexities, but does not provide the highest power efficiency (e.g., $\eta$). Power efficiency $\eta$ is defined as the ratio of the output power (e.g., Po) over the input power (e.g., Pi) wherein the input power Pi is equal to the output power Po plus the dissipated power (e.g., Pd). Mathematically, $\eta=Po/(Po+Pd)$. Further, the comparators and the reference voltages in this approach are customized for each specific application.

In another approach, a pulse representing a time when the output driver is on is issued with a pre-determined width when the output voltage Vo is below a reference voltage (e.g., a threshold voltage) Vref. As a result, the pulse width is fixed.

In another approach, two reference voltages are used to determine the idle time period when the output driver is off. This time period is then used to adjust the reference voltage. The response time to transients on supply and load current, however, is slow, and the dynamic adjustment is not available.

In another approach, the output voltage of the switching regulator is not efficiently utilized, e.g., it is lower or higher than the demand voltage from the device (e.g., processor) utilizing the regulator.

BRIEF DESCRIPTION OF THE DRAWINGS

The details of one or more embodiments of the disclosure are set forth in the accompanying drawings and the description below. Other features and advantages will be apparent from the description, drawings, and claims.

Like reference symbols in the various drawings indicate like elements.

DETAILED DESCRIPTION

Figure 1:
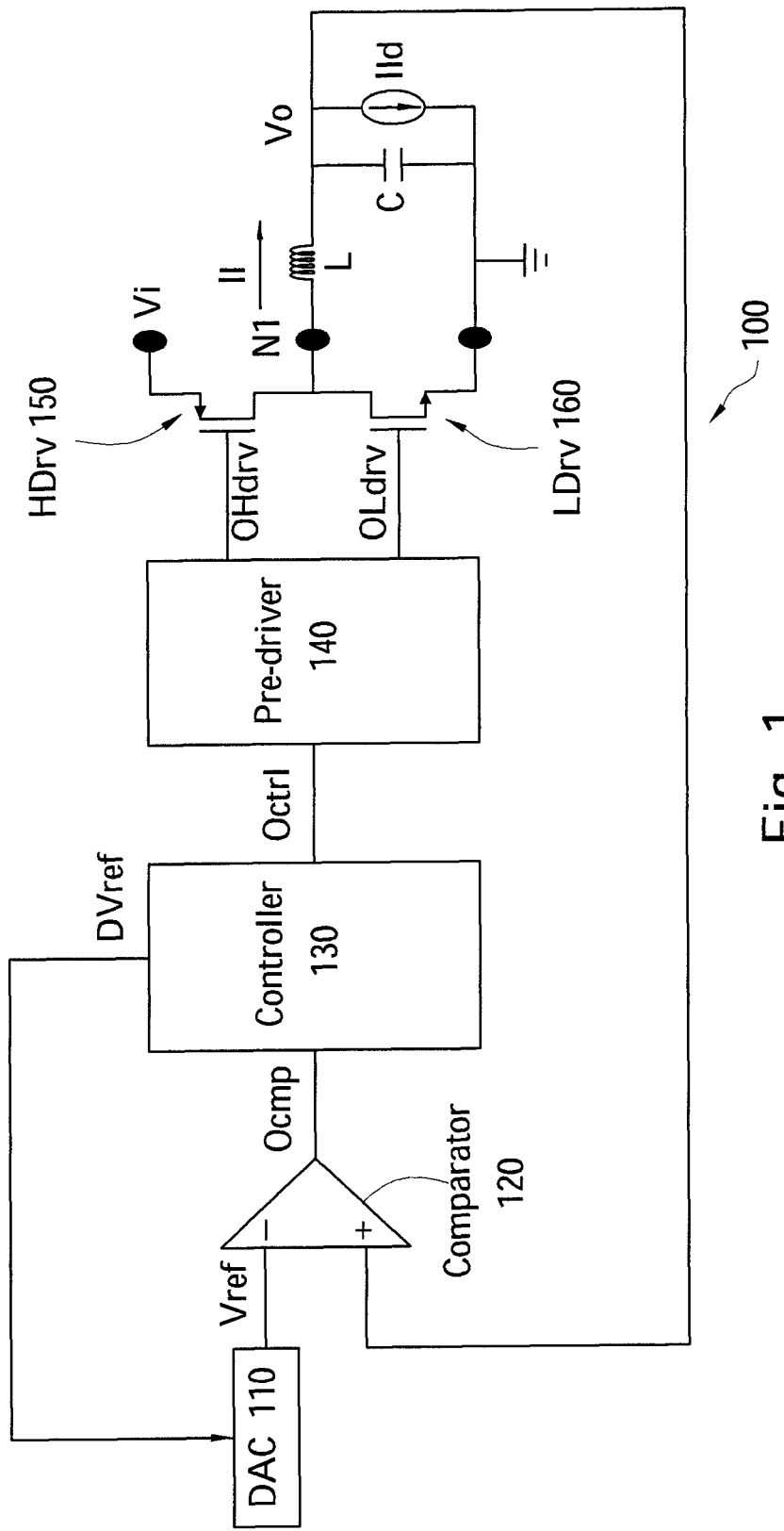
FIG. 1 is an exemplary circuit, in accordance with some embodiments.

Embodiments, or examples, illustrated in the drawings are now disclosed using specific language. It will nevertheless be understood that the embodiments and examples are not intended to be limiting. Any alterations and modifications in the disclosed embodiments, and any further applications of the principles disclosed in this document are contemplated as would normally occur to one of ordinary skill in the pertinent art. Reference numbers may be repeated throughout the embodiments, but they do not require that feature(s) of one embodiment apply to another embodiment, even if they share the same reference number.

Some embodiments can have one or a combination of the following features and/or advantages. In some embodiments, dynamic adjustment of the pulse width or the duty cycle of pulses used in converting the DC-to-DC voltage in light current loads is available to optimize power efficiency. In some embodiments, the output voltage of the switching regulator is controlled adaptively regardless of the input voltage, the output voltage, the load conditions and/or the components driven by the regulator. In some embodiments, a digital approach is used to calculate the pulse width, resulting in a higher power efficiency compared to other approaches. In some embodiments, the battery life of the battery providing input voltage to the switching regulator (e.g., for use in mobile computers, cell phones, etc.) is extended. In some embodiments, the output voltage of the switching regulator is adjusted based on dynamic voltage frequency scaling (DVFS), and therefore saves power.

Exemplary Circuit

FIG. 1 is a block diagram of a switching regulator 100, in accordance with some embodiments. In the illustration of FIG. 1, switching regulator 100 dynamically adjusts voltage Vo so that the peak of voltage Vo (e.g., voltage Vop) is around a pre-defined threshold voltage (e.g., voltage +ripple shown in FIG. 2 below). In some embodiments, regulator 100 functions in the pulse frequency modulation (PFM) mode.

Digital-to-analog converter (DAC) 110 receives from controller 130 signal Dvref, which is a digital signal of voltage Vref, and converts it to an analog voltage Vref. Voltage Vref is programmable (e.g., adjustable) by digital controller 130.

Figure 2:
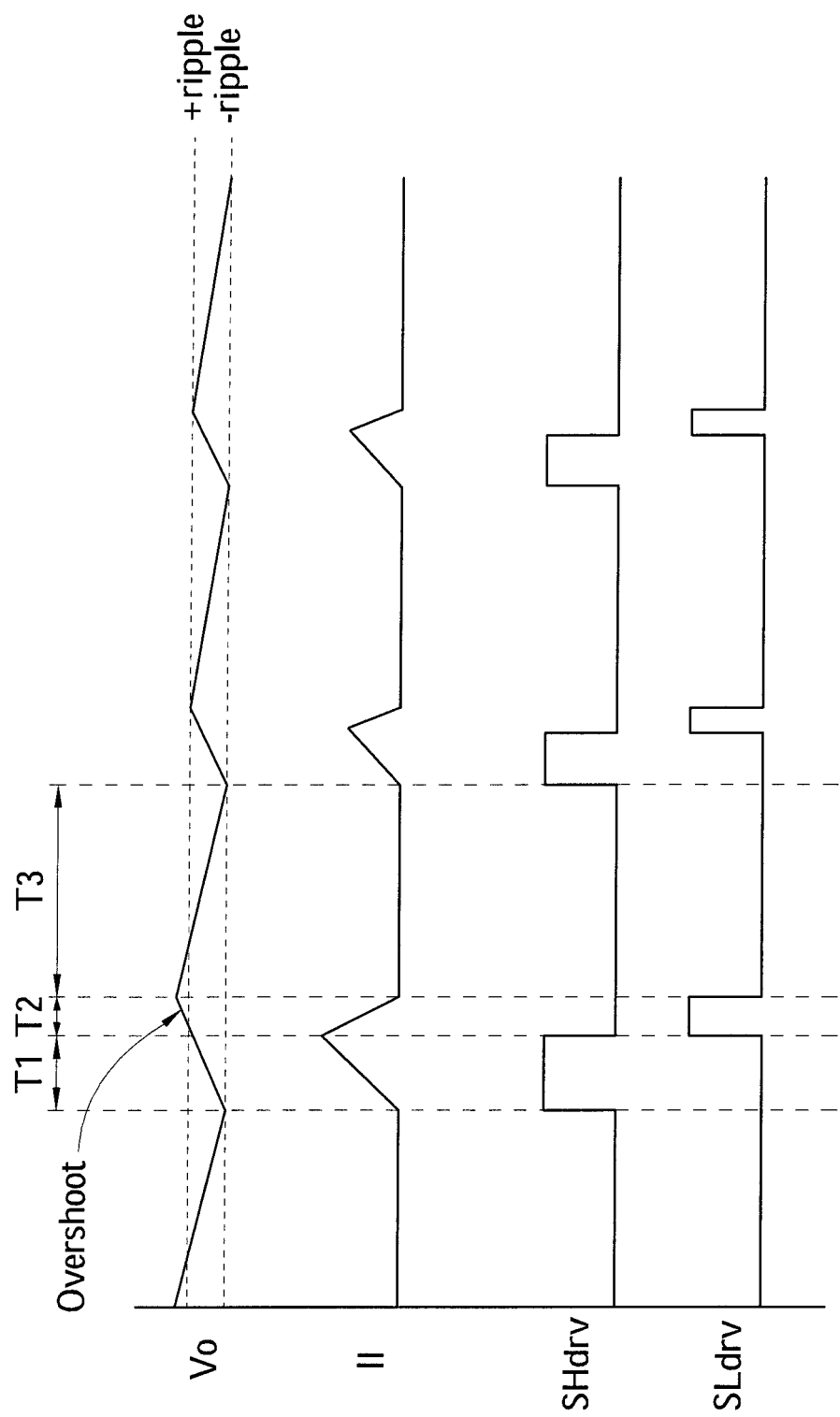
FIG. 2 is graph of waveforms illustrating the behavior of the output voltage and inductor current with respect to the high-side and low-side drivers of FIG. 1, in accordance with some embodiments.

Comparator 120 compares output voltage Vo with voltage Vref and provides output Ocmp for use by controller 130. In some embodiments, signal Ocmp is digital, i.e., having a low logic level (e.g., Low) or a high logic level (e.g., High). Signal Ocmp is High when voltage Vo is higher than voltage Vref and is Low when voltage Vo is lower than voltage Vref. In some embodiments, reference voltage Vref is initially calculated from an estimated duty cycle. Comparator 120 compares this estimated/calculated voltage Vref with voltage Vo and generates the corresponding output Ocmp for use by controller 130. Once voltage Vref is adjusted to a new value, comparator 120 compares this new voltage Vref to voltage Vo, to determine, for example, whether to turn off HDrv 150. Voltage Vref is dynamically changed based on signal Ocmp and the time driver HDrv 150 is on. In some embodiments, the peak of voltage Vo (e.g., voltage Vop) is kept at about a threshold voltage (e.g., voltage +ripple as shown in FIG. 2) until circuit 100 is turned off and/or is switched to a different mode.

Dynamic digital controller 130 receives signal Ocmp as an input and provides digital voltage DVref and signal Octrl. Digital voltage DVref corresponds to a new adjusted analog voltage Vref for use by comparator 120. In some embodiments, controller 130 determines the change in voltage Vref (e.g., $\Delta$Vref) based on a duty cycle of the pulse width representing the time period driver HDrv 150 is on (e.g., time period T1 in FIG. 2). In some embodiments, controller 130 controls voltage Vop for it to be about voltage +ripple. For example, if voltage Vop drops below voltage +ripple, controller 130 pulls voltage Vo up and voltage Vop is therefore driven up towards voltage +ripple; but if voltage Vo rises above voltage +ripple, controller 130 pulls voltage Vo down and voltage Vop is therefore driven down towards voltage +ripple. In some embodiments, controller 130 performs its functions (e.g., calculating the overshoot/undershoot, the change in time period ΔT1, etc.) in the digital domain, and therefore receives digital information (e.g., signal Ocmp) from comparator Ocmp as appropriate. In some embodiments, controller 130 has information regarding whether driver HDrv 150 and/or driver LDrv 160 is on because controller 130 controls when drivers HDrv 150 and LDrv 160 are on or off. Controller 130 also includes a circuit that monitors current I1 and voltage Vo. For example, based on the result of the monitor, controller 130 determines when current I1 reaches a predetermined value (e.g., 0 A) to turn off driver LDrv 160. Controller 130 also determines when voltage Vo drops below voltage −ripple, e.g., to turn on driver HDrv 150. In some embodiments, controller 130 is implemented using Verilog or VHDL, which is a text-based hardware description language that can be implemented using standard logic cells. In some further embodiments, controller 130 is implemented as a state machine using a digital processor, logic gates in FPGA, etc. The disclosure is not limited to any method of implementing controller 130.

Pre-driver 140, based on signal Octrl, controls drivers HDrv 150 and LDrv 160, including turning it on or off, or placing it in a tri-state mode.

Voltage Vi is the input voltage converted by regulator 100 to output voltage Vo. In some embodiments, voltage Vi is from a battery, and voltage Vo is provided to a processor, a personal computer, a cellular phone, etc., as its supply voltage. In some embodiments, because voltage Vop stays within a smaller range at about voltage +ripple, converting from voltage Vi to voltage Vo is efficient, e.g., the energy is not wasted unnecessarily. Further, voltage Vop stays at about voltage +ripple regardless of the load (e.g., the amount of load current I1d). In some embodiments voltage Vo is adjusted in accordance with the demand of a device (e.g., a processor) using regulator 100. For example, when the processor demands to run in a low power mode (e.g., 0.9 V), voltage Vo is adjusted to 0.9 V, and when the processor demands to run at a higher voltage (e.g., 1.1 V) voltage Vo is also so adjusted. In some embodiments, adjusting voltage Vo is done using dynamic voltage frequency scaling (DVFS), which is a power management technique wherein the voltage and/or frequency in a component is increased or decreased depending on the circumstance. In some embodiments, adjusting voltage Vo is done by adjusting (e.g., programming) voltage Vref.

Inductor L and capacitor C store energy for regulator 100. Current I1, the current flowing through inductor L, changes according to the equation, V1−Vo=L*dI1/dt where voltage V1 is the voltage at node N1.

In some embodiments, high-side driver (HDrv) 150 and low-side driver (e.g., LDrv) 160 are turned on alternatively. For example, one driver is on, the other driver is off, but both drivers are not on at the same time. Based on the turning on and off of drivers HDrv 150 and LDrv 160, node N1 is switched between voltage Vi and ground.

Current I1d represents the "load" current, e.g., the current sunk by a device, an electronic circuit using/driven by regulator 100, including, for example, a digital processor, an embedded processor, a memory, an RF circuit, etc. Current I1d varies depending on applications and/or the device driven by (e.g., using) regulator 100. In some embodiments, regulator 100 is used in "light" load conditions, e.g., I1d is up to about 100 mA.

Illustrative Waveforms

FIG. 2 is a graph of waveforms illustrating the behavior of voltage Vo and current I1 with respect to the operation states of drivers HDrv 150 and LDrv 160. For illustration, only the alternating current (AC) component of voltage Vo is shown, even though voltage Vo includes a direct current (DC) component and an AC component.

Signals SHdrv and SLdrv indicate whether the respective drivers HDrv 150 and LDrv 160 are on or off. For example, if signal SHdrv is at a high logic level (e.g., High), then driver HDrv 150 is on, but if signal SHdrv is at a low logic level (e.g., Low), then driver HDrv 150 is off. Similarly, if signal SLdrv is High, then driver LDrv 160 is on, but if signal SLdrv is Low, then driver LDrv 160 is off.

In FIG. 2, signals Vo, I1, SHdrv (and thus HDrv 150), and SLdrv (and thus LDrv 160) are shown cyclic through three time periods T1, T2, and T3. During period T1, signal SHdrv is High indicating that driver HDrv 150 is on, signal SLdrv is Low indicating driver LDrv 160 is off, current flows from the node of voltage Vi through driver HDrv 150, inductor L, and capacitor C. As a result, charges are injected into capacitor C, and both current I1 and voltage Vo increase.

During period T2, signal SHdrv is Low indicating driver HDrv 150 is off while signal SLdrv is High indicating driver LDrv 160 is on, current I1 flows from ground through driver LDrv 160 to the node of output Vo. As a result, current I1 decreases. Once current I1 reaches 0 A, controller 130 turns off driver LDrv 160. The pulse representing time period T1 or T2 when the respective signal SHDrv or SLDrv is High is also called a charge pulse because during that time the charge is added to capacitor C.

During period T3, both signals SHDrv and SLDrv are Low indicating both drivers HDrv 150 and LDrv 160 are off, current I1 is zero. The current at the node of output voltage Vo flows through capacitor C and discharges voltage Vo. As a result, voltage Vo decreases. In some embodiments, controller 130 monitors voltage Vo, and when controller 130 detects that voltage Vo reaches a low threshold voltage (e.g., voltage −ripple), controller 130 turns on driver HDrv 150 again. Signal SHdrv is therefore High again, starting a new cycle through time periods T1, T2, and T3. That is, in another period T1, driver HDrv 150 is on while driver LDrv 160 is off, in another period T2 driver HDrv 150 is off while LDrv 160 is on, and in another period T3 both drivers HDrv 150 and LDrv 160 are off, etc. The duration of period T3 depends on the size of capacitor C and of the load (e.g., current I1d). For example, if current I1d is large, period T3 is small because current I1d can quickly removes the charge from capacitor C. In contrast, if current I1d is small, period T3 is large.

In some embodiments, the voltage difference between voltage +ripple and −ripple (e.g., voltage Vripple) is a design specification at, for example, 20 mV, 30 mV, 50 mV, etc. In some situations, when voltage Vop rises above voltage +ripple, the voltage above voltage +ripple is called an overshoot, but when voltage Vop drops below voltage +ripple, the voltage below voltage +ripple, is called an undershoot. For illustration, an overshoot is shown in period T2.

Exemplary Operation of Controller 130

In some embodiments, the duration of period T1 and/or T2 affects the amount of current I1, the increase amount of voltage Vo during periods T1 and T2, and thus the overshoot or undershoot of voltage Vo. For example, in the overshoot situation, because voltage Vo increases during both periods T1 and T2, a long period T1 and/or T2 results in a large Vo increase, and thus a large overshoot. In contrast, a shorter period T1 and/or T2 results in a smaller voltage Vo increase, and thus a smaller overshoot. In the undershoot situation, however, a shorter period T1 and/or T2 results in a smaller Vo increase, and thus a larger undershoot. A longer period T1 and/or T2, nevertheless, results in a larger Vo increase, and thus a smaller undershoot.

In some embodiments, controller 130 dynamically adjusts the duration of period T1 such that voltage Vop is at about voltage +ripple and is therefore efficiently regulated to satisfy the voltage demanded by the load driven by regulator 100. Controller 130 thus adjusts the duration of period T1 to adjust the overshoot or undershoot of voltage Vo. As a result, voltage Vop is maintained at about voltage +ripple. For example, if voltage Vop rises above voltage +ripple, controller 130 adjusts period T1 to pull down voltage Vop to about voltage +ripple. But if voltage Vop drops below voltage +ripple, controller 130 adjusts period T1 to pull up voltage Vop to about voltage +ripple. Because controller 130 dynamically pulls up or pulls down voltage Vop to voltage +ripple voltage Vop is adjusted dynamically, and is continually at about voltage +ripple.

Controller 130 controls when to turn on/off driver HDrv 150. Controller 130 determines when to turn off driver HDrv 150 and simultaneously turn on driver LDrv 160 based on the result of comparing voltage Vo with voltage Vref. Controller 130 also controls when to turn on/off driver LDrv 160. For example, when voltage Vo reaches voltage −ripple, controller 130 issues the corresponding signal Octr1 (e.g., a High) to turn on driver HDrv 150.

In some embodiments, controller 130 determines the shift (e.g., the change) of reference voltage Vref (e.g., ΔVref) by the equation $$\Delta Vref = D * Vripple$$

wherein ratio D is the ratio of the time when driver HDrv 150 is on over the total time when both drivers HDrv 150 and LDrv 160 are on (e.g., the ratio T1/(T1+T2)). Ratio D is also called the duty cycle of the time period T1+T2.

In some embodiments, ratio D is a 4-bit digital number, voltage Vripple is a 5-bit digital number, and voltage ΔVref is a digital number capable of storing the result of D*Vripple. Further, the pulse width of signals SHDrv and SLDrr, and Vo overshoot and undershoot are also digital. After controller 130 calculates voltage ΔVref, controller 130 adds/subtracts it to the previous voltage Vref, and provides the new digital Dvref, which is converted by DAC 110, to analog Vref for use by comparator 120.

In some embodiments, voltage Vref is adjusted based on voltage ΔVref to match the load condition. Because voltage Vref changes, voltage Vo also changes. The shape of voltage Vo changes according to the load condition. For example, if current I1$d$ is large (e.g., a large load), voltage Vo drops at a faster rate than a smaller current I1$d$ (e.g., a smaller load). Further, when both drivers HDrv 150 and LDrv 160 are off, voltage Vo drops sharply. In contrast, when the load is light (e.g., small current I1$d$), voltage Vo drops slowly.

In some embodiments, controller 130 calculates the change of period T1 (e.g., period change ΔT1) or the difference of the two consecutive periods T1 of signals SHDrv based on the equation $$\Delta T1 = D * \Delta Vo$$

wherein ΔVo is the difference between voltage Vo and voltage +ripple. In the overshoot situation, voltage ΔVo is negative, and period change ΔT1 is therefore negative. In the undershoot situation, voltage ΔVo is, however, positive, and period change ΔT1 is also positive.

Exemplary Method

Figure 3:
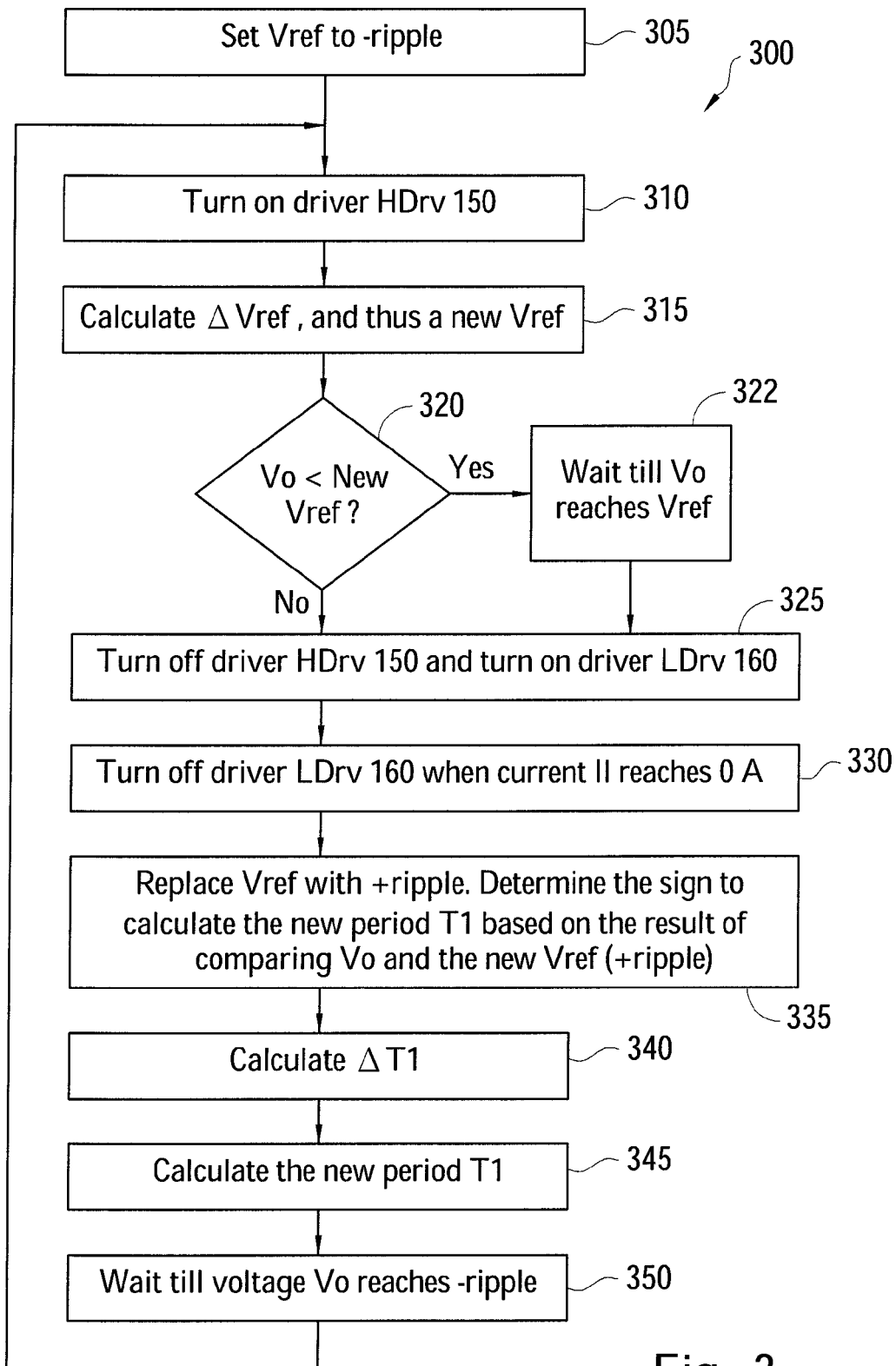
FIG. 3 is a flowchart illustrating a method of operating the circuit in FIG. 1, in accordance with some embodiments.

FIG. 3 is a flowchart 300 illustrating a method in accordance with some embodiments. In this illustration, circuit 100 and thus driver HDrv 150 is first turned on, corresponding to a start of time period T1.

In step 305, voltage Vref is set at voltage −ripple to set the lower limit for voltage Vo, i.e., so that voltage Vo does not drop below voltage −ripple.

In step 310, circuit 100 is turned on. As a result, driver HDrv 150 is turned on, and signal SHdrv is consequently High. Because driver HDrv 150 is on, voltage Vo starts increasing.

In step 315, controller 130 calculates the change ΔVref of reference voltage Vref and thus a new voltage Vref from the equation $$\Delta Vref = D * Vripple$$

In some embodiments using the PFM mode, duty cycle D is estimated/calculated from the ratio Vo/Vi because Vo/Vi=T1/(T1+T2). In some other embodiments using the PWM mode, duty cycle D is available without estimation or calculation. In some embodiments, circuit 100 starts with the PWM mode and switches to the PFM mode.

In step 320, comparator 120, having the information from controller 130, determines the voltage relationship between voltage Vo and the new voltage Vref (e.g., determines whether voltage Vo is less than the new voltage Vref). If voltage Vo is less than the new voltage Vref, controller 130, in step 322, waits till voltage Vo reaches the new voltage Vref (e.g., voltage Vo is equal to or a little higher than voltage Vref), and the flowchart 300 continues to step 325. But if voltage Vo in step 320 is already higher than the new voltage Vref, the flowchart 300 continues to step 325 from step 320.

In step 325, controller 130 turns off driver HDrv 150 and turns on driver LDrv 160. Signals SHdrv and SLdrv therefore turn Low and High, respectively. Because driver LDrv 160 is on, current I1 starts decreasing.

In step 330, controller 130 turns off driver LDrv 150 when current I1 reaches 0 A.

In step 335, controller 130 replaces voltage Vref with voltage +ripple so that comparator 120 compares voltage Vop with voltage +ripple to determine the sign of voltage ΔVo. If voltage Vop is greater than voltage +ripple, then the sign is negative, but if voltage Vop is lesser than voltage +ripple, then the sign is positive. The sign of period change ΔT1 follows the sign of voltage ΔVo. Stated differently, if voltage Vo is overshot, then the period change ΔT1 is negative, but if voltage Vo is undershot, then the period change ΔT1 is positive.

In step 340, controller 130 calculates the period change ΔT1 based on the equation $$\Delta T1 = D * \Delta Vo$$

In step 345, controller 130 calculates the new period T1 wherein the new period T1 is the old period T1 changed by ΔT1.

In step 350, controller 130 waits for voltage Vo to reach voltage −ripple and then turns on driver HDrv 150. In some embodiments, voltage Vref is replaced with voltage −ripple for controller 130 via comparator 120 to determine whether voltage Vo reaches voltage −ripple. At that time the flowchart 300 flows back to step 310 and continues therefrom, i.e., starting the loop of the steps 310, 315, 320 (or 322), 325, 330, 335, 340, 345, and 350, which is performed continually until circuit 100 is turned off or switched to a different mode.

In the above illustration of FIG. 3, voltage Vop, in effect, is pulled toward voltage +ripple in both situations where voltage Vop is lower or higher than voltage +ripple. That is, if voltage Vop is lower than voltage +ripple, voltage Vop is pulled up toward voltage +ripple, but if voltage Vop is higher than voltage +ripple, voltage Vop is pulled toward voltage +ripple. As a result, voltage Vop is constantly at about the level of voltage +ripple. Further, period T1 is adjusted such that regulator 100 (e.g., drivers HDrv 150 and LDrv 160) is switched in a specified range, which is more efficient than switching in a range deviated from (e.g., lower than) the specified range. As a result, high power efficiency η is achieved. Because power efficiency η is higher, in some embodiments, the battery life providing voltage Vi is extended because the more efficient circuit 100 is, the less energy is wasted, and the battery life is prolonged. In some embodiments, the digital implementation of controller 130 is reliable because the digital nature of controller 130 enables it to be immune from the process, voltage, and temperature (PVT) variations. Circuit 100 is also robust because circuit 100 is also immune from voltage irregularities, noise, etc. In some embodiments, controller 130 or circuit 100 is easily reused by different process technologies, (e.g., 0.18 μm, 65 nm, etc.) because, in some embodiments, controller 130 is implemented using Verilog, which is a text-based hardware description language (HDL) and is independent of the process technology. For example, circuit 100/controller 130 is initially designed for one technology (e.g., 0.18 μm), and later converted to a different technology (e.g., 65 nm).

A number of embodiments have been described. It will nevertheless be understood that various modifications may be made without departing from the spirit and scope of the disclosure. In the above illustration, controller 130 performs various functions, e.g., calculate $\Delta T1$, $\Delta Vref$, turns on/off drivers HDrv 150 and LDrv 160, etc., but the disclosed embodiments are not so limited. Various different circuits can perform different functions. For example, an independent circuit can detect that current I1 has reach 0 A, voltage Vo has reached voltage −ripple, etc., and provides a signal to controller 130 to act accordingly.

The above method shows exemplary steps, but they are not necessarily performed in the order shown. Steps may be added, replaced, changed order, and/or eliminated as appropriate, in accordance with the spirit and scope of disclosed embodiments.

What is claimed is:

1. A method of controlling a regulator having an input voltage and an output voltage, comprising:
   setting a reference voltage to a first voltage level;
   turning on a first driver;
   determining a duration ratio having a first time period over the first time period and a second time period; the first time period and the second time period indicating a duration when the first driver and a second driver is on, respectively;
   generating a second voltage level based on the duration ratio and a ripple voltage that is a difference between a high threshold voltage and a low threshold voltage;
   turning off the first driver and turning on the second driver based on a relationship between the second voltage level and a voltage level of the output voltage;
   turning off the second driver when a current flowing through a node of the output voltage reaches a predetermined level; and
   generating a change in the first time period based on the duration ratio and a voltage difference between a peak of the output voltage and the high threshold voltage.

2. The method of claim 1 wherein the first voltage level is about the low threshold voltage.

3. The method of claim 1 further comprising automatically changing the first time period.

4. The method of claim 1 further comprising using the ratio and a voltage difference between the peak of the output voltage and the high threshold voltage to automatically change the first time period.

5. The method of claim 1 wherein the duration ratio is about a voltage ratio of the output voltage over the input voltage.

6. The method of claim 1 wherein the change in the first time period is a based on the equation $$\Delta T1 = D * \Delta Vo$$

wherein $\Delta T1$ is the change in the first time period, D is the duration ratio and $\Delta Vo$ is the voltage difference between a peak of the output voltage and the high ripple voltage.

7. The method of claim 1 further comprising using a controller to provide the reference voltage to a first input of a comparator; and feeding back the output voltage to a second input of the comparator.

8. The method of claim 1 wherein:
   the output voltage increases during the first and the second time period, and decreases during a third time period;
   the current increases during the first time period, decreases during the second time period, and is zero during the third time period; and
   in the third time period, the first driver and the second driver are off.

9. A method of controlling a regulator having an input voltage and an output voltage, comprising:
   specifying a ripple voltage that is a difference between a first ripple voltage and a second ripple voltage;
   turning on a first driver for a first time period and turning on a second driver for a second time period during a current regulating cycle;
   if a peak voltage of the output voltage is above the first ripple voltage during the current regulating cycle, then pulling the peak voltage down towards the first ripple voltage during a next regulating cycle; and
   if the peak voltage of the output voltage is below the first ripple voltage during the current regulating cycle, then pulling the peak voltage up towards the first ripple voltage during the next regulating cycle;
   wherein pulling the peak voltage down towards the first ripple voltage or pulling the peak voltage up towards the first ripple voltage during the next regulating cycle is based on a ratio of the first time period over the first time period and the second time period.

10. The method of claim 9 wherein the ratio is about a voltage ratio of the output voltage over the input voltage.

11. The method of claim 9 further comprising turning on the first driver for the first time period, then turning off the first driver and turning on the second driver for the second time period.

12. The method of claim 11 further comprising after turning on the second driver for the second time period, turning off both the first driver and the second driver for a third time period.

13. The method of claim 9 wherein pulling the peak voltage down towards the first ripple voltage or pulling the peak voltage up towards the first ripple voltage is further based on adjusting the first time period for the next regulating cycle.

14. The method of claim 9 wherein:
   the output voltage increases during the first and the second time periods, and decreases during a third time period;
   a current flowing through an output node of the output voltage increases during the first time period, decreases during the second time period, and is zero during the third time period; and
   in the third time period, the first driver and the second driver are off.

15. A method of controlling a regulator having an input voltage and an output voltage, comprising:

turning on a first driver during a first cycle for a first time period;

turning off the first driver and turning on a second driver during the first cycle for a second time period;

turning off the second driver during the first cycle for a third time period; the first driver and the second driver are thereby off during the third time period; and adjusting the first time period to become an adjusted first time period for a second cycle based on a ratio having the first time period over the first time period and the second time period and a voltage difference between a peak value of the output voltage and a first voltage during the first cycle.

16. The method of claim 15 wherein the output voltage is about the first voltage.

17. The method of claim 15 further comprising using a reference voltage and a second peak value of the output voltage to turn off the first driver and turn on the second driver.

18. The method of claim 15 wherein turning off the second driver occurs when a current flowing through the second driver reaches a pre-determined value.

19. The method of claim 15 wherein turning on the first driver occurs when the output voltage reaches a second voltage; a difference between the first voltage and the second voltage being a pre-determined value.

20. The method of claim 15 wherein:

the output voltage increases during the first and the second time period, and decreases during the third time period; and a current flowing through an output node of the output voltage increases during the first time period, decreases during the second time period, and is zero during the third time period.

* * * * *